No. 665,059.  
R. P. BURKHARDT, Sr.  
MACHINE FOR CUTTING CHAIR SEATS.  
(Application filed Feb. 3, 1900.)  
Patented Jan. 1, 1901.  
(No Model.)  
5 Sheets—Sheet 2.

No. 665,059. Patented Jan. 1, 1901.
R. P. BURKHARDT, Sr.
MACHINE FOR CUTTING CHAIR SEATS.
(Application filed Feb. 3, 1900.)

(No Model.) 5 Sheets—Sheet 3.

WITNESSES: INVENTOR,
Carl Stroe. R. P. Burkhardt, Sr.
Robert R. Nevin By R. J. McCarty
 his ATTORNEY.

No. 665,059. Patented Jan. 1, 1901.
R. P. BURKHARDT, Sr.
MACHINE FOR CUTTING CHAIR SEATS.
(Application filed Feb. 3, 1900.)

(No Model.) 5 Sheets—Sheet 4.

WITNESSES:
Carl H Noe.
Robert R. Nevin.

R. P. Burkhardt Sr.
INVENTOR.
By R. J. McCarty,
his ATTORNEY.

No. 665,059. Patented Jan. 1, 1901.
R. P. BURKHARDT, Sr.
MACHINE FOR CUTTING CHAIR SEATS.
(Application filed Feb. 3, 1900.)

(No Model.) 5 Sheets—Sheet 5.

WITNESSES:
Robt. R. Nevin
John W. Kaltfus

R. P. Burkhardt Jr.
INVENTOR
By R. J. McCarty
his ATTORNEY.

UNITED STATES PATENT OFFICE.

RICHARD P. BURKHARDT, SR., OF DAYTON, OHIO.

MACHINE FOR CUTTING CHAIR-SEATS.

SPECIFICATION forming part of Letters Patent No. 665,059, dated January 1, 1901.

Application filed February 3, 1900. Serial No. 3,810. (No model.)

*To all whom it may concern:*

Be it known that I, RICHARD P. BURKHARDT, Sr., a citizen of the United States, residing at Dayton, in the county of Montgomery and State of Ohio, have invented certain new and useful Improvements in Machines for Cutting Saddle-Seats for Chairs; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention comprises a machine for producing seats known as "saddle-seats" for chairs.

The invention will be fully described and claimed in the following specification and is shown in the annexed drawings, of which—

Figure 1:
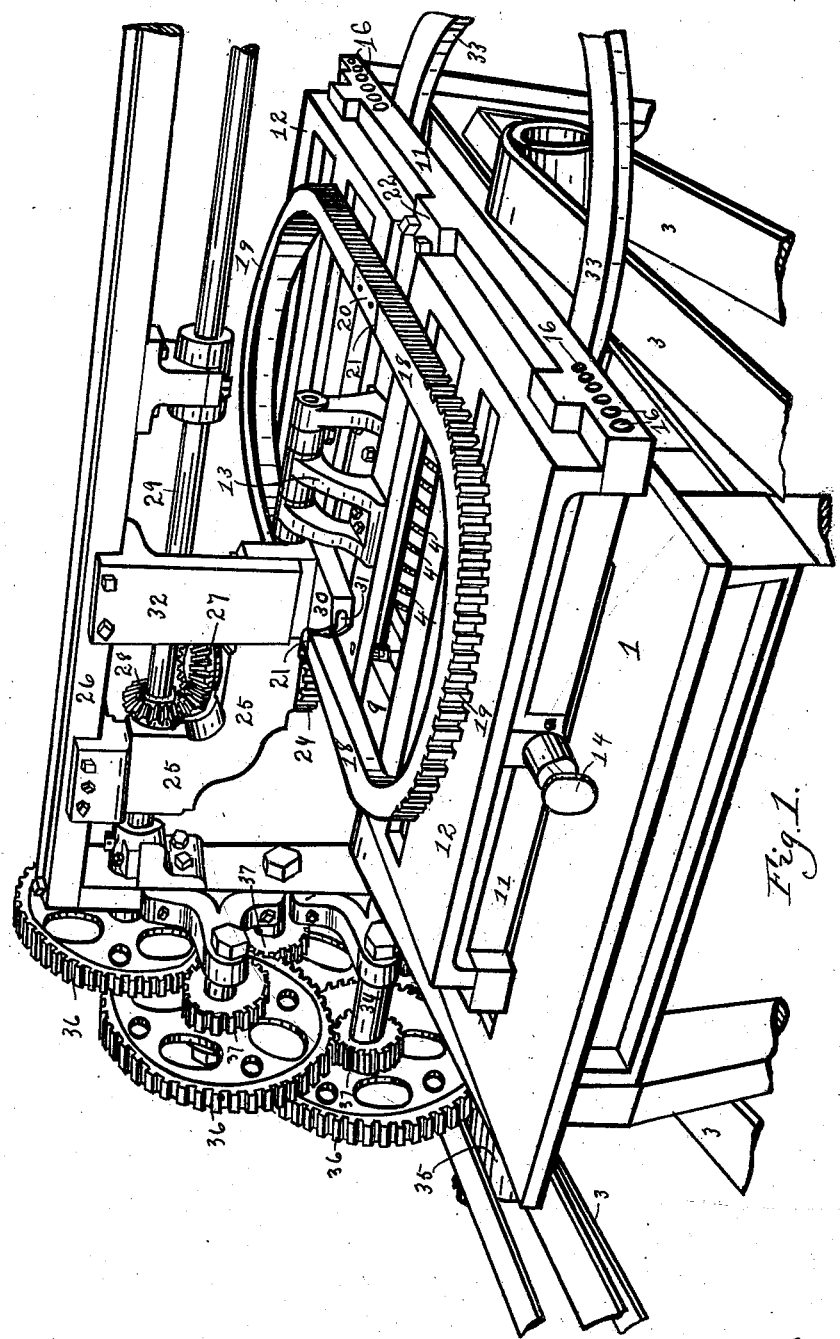
Figure 2:
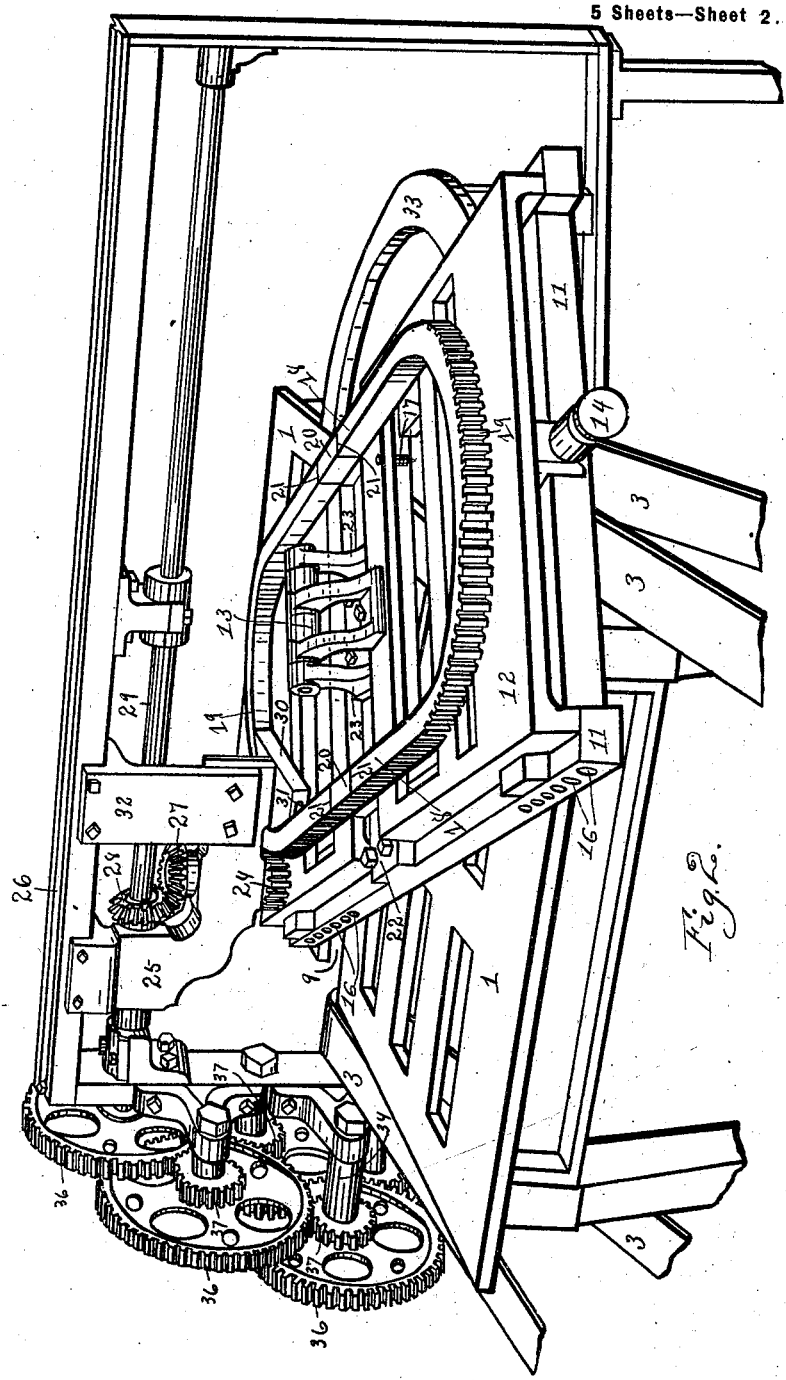
Figure 3:
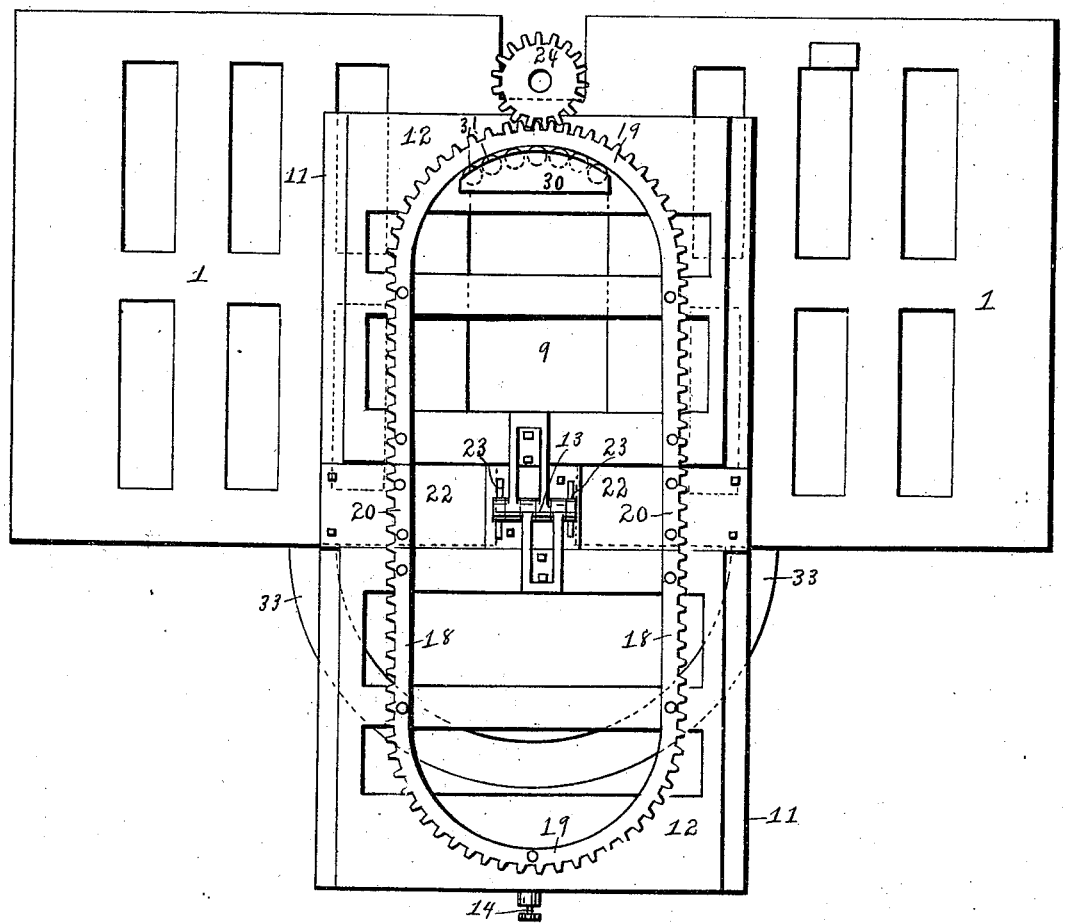
Figure 4:
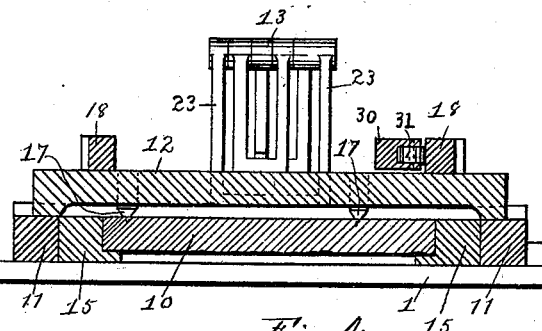
Figure 5:
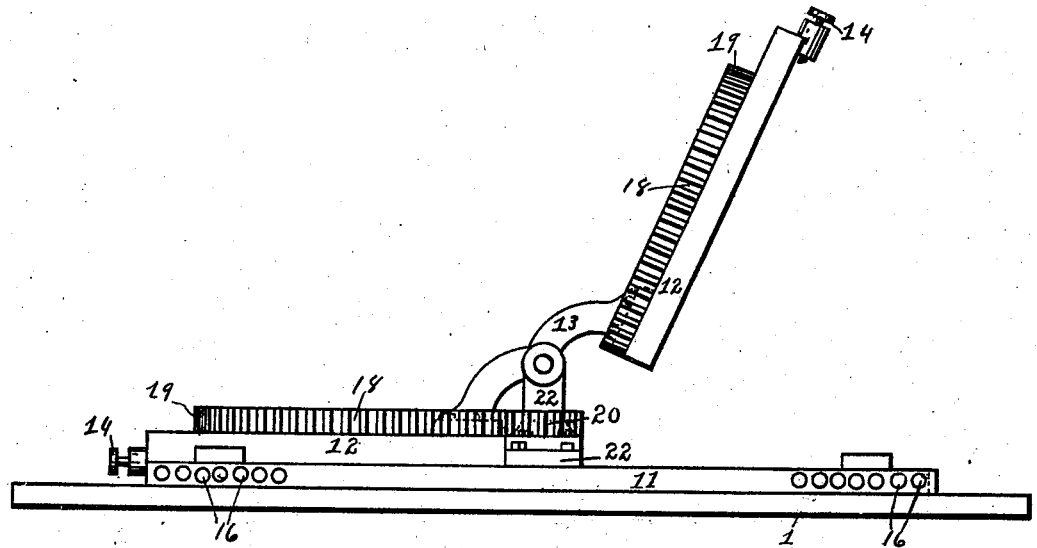
Figure 12:
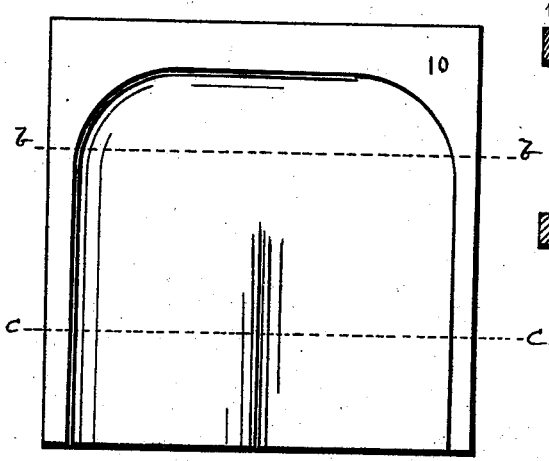
Figure 13:
Figure 14:
Figure 6:
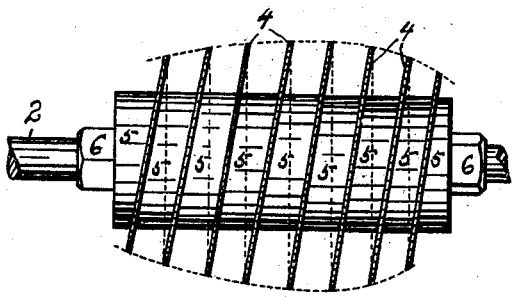
Figure 7:
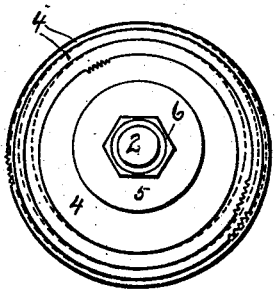
Figure 9:
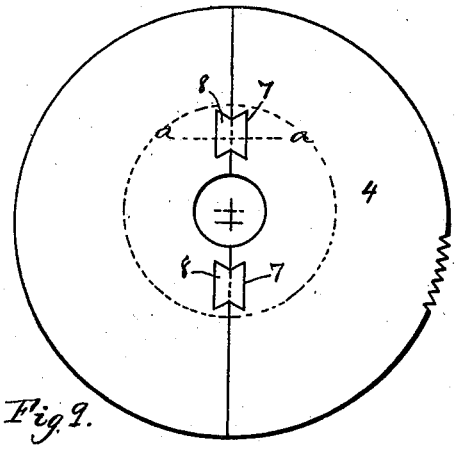
Figure 8:
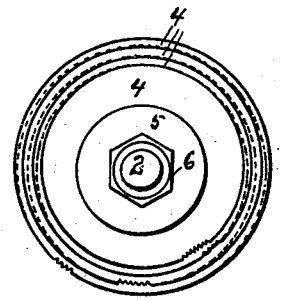
Figure 11:
Figure 10:
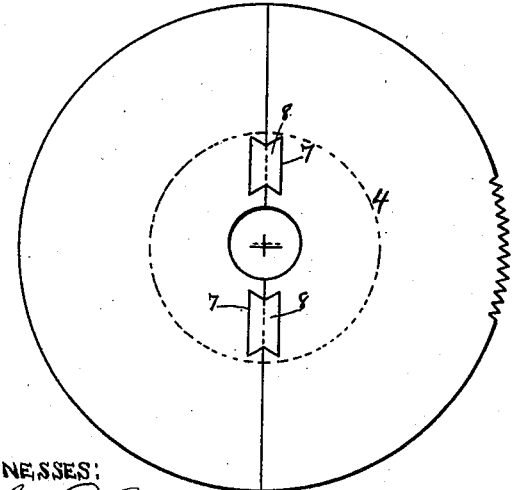

Figure 1 is a perspective view showing the position of the saws, which are stationary as to any lateral movement, and one position of the movable frame in which the stock from which the seats are made is held. Fig. 2 is a similar view to Fig. 1, showing another position of the movable frame in which the stock from which the seats are made is held. Fig. 3 is a plan view of the stationary table and the movable stock-frame, the teeth being omitted from a portion of said stock-frame. Fig. 4 is a transverse section of said movable frame, showing the stock in position in one end thereof. Fig. 5 is a side elevation showing one end of the movable stock-frame elevated to a position to permit the insertion of stock in one end of the frame. Fig. 6 is an elevation of the assemblage of saws detached; Fig. 7, a side elevation of the saws looking at the right-hand end of the assemblage; Fig. 8, a side elevation of the saws looking at the left-hand end of the assemblage; Figs. 9 and 10, elevations of saws, showing the two extreme positions of the openings therein; Fig. 11, a sectional view on the line *a a* of Fig. 9; Fig. 12, a plan view of the stock after being operated upon by the saws; Figs. 13 and 14, sectional views, respectively, of the seat on lines *b b* and *c c* of Fig. 12.

In a detailed description similar reference characters will denote corresponding parts in the several views.

1 designates the stationary table, which has a number of openings therein for the passage of the sawdust. Journaled at a suitable point near the center of this table is a transverse shaft 2, upon which are two pulleys driven from belts 3 3. The shaft 2 has rigidly mounted upon it an assemblage of circular saws 4, which are graduated in their diameters from each end to the center, the saws of the smaller diameters ranging inwardly from the ends of the assemblage. These saws are arranged on uniform angles, so that in the rotation thereof one saw will begin its operation at the point where the next adjacent saw of smaller diameter has ceased its operation of cutting the material from which the seat is made, so that in the complete operation of the saws there will be a cavity cut in the material of gradual curvature free from any ridges and of substantially the same form and outline as shown in Figs. 13 and 14. These saws, it will be observed, have the openings therein for the shaft cut slightly away from the centers, so as to provide a greater depth of the saws on one side than on the other. For example, the next adjacent larger saw which begins to cut the stock at the point where the smaller saw ceases to cut has one side of a proper depth to continue the cut where said smaller saw left off, and as said large saw rotates the side having the greatest depth cuts the cavity deeper and ceases to operate upon the stock at a point where the greatest depth of the next adjacent large saw begins its work. The two larger saws or those occupying the more central positions have the openings therein nearest their centers, for the reason that the portion of the cavity or recess cut by these saws is required to be of less curvature.

It will be seen from Figs. 6, 7, and 8 that the two extreme end saws are reversed in their positions—that is to say, the sides of said saws having the shortest depth from the collars 5 occupy reversed positions when assembled. The saws are secured upon the shaft 2 in the positions shown by means of the collars 5, which fit over the shaft and are tightened by means of nuts 6.

In order to avoid the necessity of removing the entire shaft from the machine when it becomes necessary to remove any of the said saws for sharpening, said saws may be made in two halves, as shown in Figs. 9 and 10, and provided with dovetail grooves or key-seats 7, in which keys 8 may be placed to securely lock the two parts when on the shaft. The collars fitting against the keys 8, as shown in dotted circles, Figs. 9 and 10, will hold said collars securely in position. There is a transverse opening 9 in the center of the table 1, below which the saws are mounted and which enables said saws to come in contact with the stock 10. The stock is carried securely in the lower part 11 of the movable frame, which is supported on the table 1. This frame consists of lower and upper parts 11 and 12, respectively. The upper part 12 is joined in the center by means of a hinge 13 and may be elevated from either end to permit of the insertion of stock in the lower part 11 of said frame.

To elevate the upper portion of the frame, the dog or detent 14 is pressed inwardly to disengage the upper and lower parts of said frame. The lower portion of the frame is adapted to securely hold different sizes of stock from which seats are made by means of wooden strips 15, which are secured to the inner sides of said lower part by means of wooden screws which penetrate openings 16. The upper part of the frame is provided with pins 17, which engage the upper side of the stock when said upper portion of the frame is lowered and secured, as shown in Fig. 4, and thereby the said stock is held firmly to be properly acted upon by the saws. The upper or hinged portion of the stock-frame supports a double rack or parallel toothed bars 18 18, which are joined at the ends by semicircular or approximately semicircular racks or toothed bars 19 19 of uniform curvature, so that a continuous rack, comprising two straight sides 18 18, with two uniformly-rounded ends 19 19, is produced. This rack is broken at similar points 21 21 on each side in order to enable the upper or hinged part of the frame to be lowered and elevated in placing stock in position. The parts 20 20 of the rack are secured to the middle or stationary part 22, to which the side portions 23 23 of the hinge are also secured.

24 is a toothed pinion which meshes with the rack and drives the stock-frame from end to end in straight back and forth directions and turns said frame as the rounded edges of the rack are engaged by said pinion. This movement of the stock-frame gradually moves the position of the stock therein, so that the saws will operate to cut the desired surface therein, as shown in Figs. 12, 13, and 14. The pinion 24 is on the lower end of a shaft which passes through a hanger 25, that is secured to the upper horizontal bar 26. Said shaft is driven by means of miter-gears 27 and 28, the latter of which is fast on horizontal shaft 29, which is driven by gearing hereinafter described.

30 is a stationary guide or shoe arranged on the inside of the rack and which is provided with antifriction-rollers 31, which are always in contact with the inner side of the rack, so that the friction between said rack and the guide is reduced to a minimum. The guide 30 has its outer side rounded to correspond with the rounded portions of the rack, and thereby the said rack is permitted to turn as the rounded ends thereof approach the guide, all of the antifriction-rollers 31 being in contact with the inner side of the rack when the same is being turned at either end. When the rack is traveling in a straight line, it is also maintained in position to engage with the pinion by said guide. The guide is rigidly secured to a hanger 32, projecting down from the horizontal bar 26.

When the stock-frame is moved on angles to the stationary table 1, the end that is projected off of said table is supported on a track 33, which is suitably secured to said table or may be secured independently thereof; but in any event the upper side of said track should be on the same plane with the upper side of the table. The stub-shaft 34, through which the stock-frame is driven, receives motion through a differential pulley 35, which is belted to a counter-shaft. (Not shown.) From the stub-shaft 34 motion is transmitted to shaft 29 through a train of gearing consisting of large and small spur-wheels 36 and 37. The saw-shaft 2 is driven at a different speed from the same counter-shaft from which shaft 29 receives its motion.

It will be understood that each end of the stock-frame may be elevated on the hinge, as shown in Fig. 5, and that each end contains a piece of stock, such as is shown in Fig. 13, so that two seats are cut in each complete movement of the stock-frame.

By arranging the saws on uniform angles a less number may be used than if said saws were mounted in perpendicular positions or positions at right angles to the shaft. In the latter case the entire space occupied by the assemblage of saws would have to be closed up by placing the saws close together, and of course finer degrees of graduation in the diameters of the saws would have to be observed. It is thought that the arrangement shown in the drawings is preferable.

Having described my invention, I claim—

1. In a machine for cutting saddle-seats for chairs, the combination with a stationary table, of an assemblage of saws arranged on a shaft at uniform angles and of varying diameters, a stock-frame mounted above said saws, the upper portion of said frame having a hinged connection so that it may be opened for the insertion of stock, means for holding the stock within said frame, and means for imparting longitudinal movements to said frame and for reversing the movement thereof at the completion of each longitudinal movement, substantially as and for the purposes specified.

2. In a machine for cutting saddle-seats for chairs, the combination with a stationary table, of an assemblage of circular saws of varying diameters and arranged on a shaft at uniform angles, a movable frame having its upper part hinged, means for imparting longitudinal movements to said frame and for reversing the movement thereof at the completion of each longitudinal movement, and a stationary guide or shoe for directing the movements of said frame, substantially as and for the purposes specified.

3. In a machine for cutting saddle-seats for chairs, the combination with an assemblage of circular saws arranged upon a common shaft at uniform angles to said shaft, the said saws being of varying sizes and those of the larger diameters being nearest the middle of the assemblage, a movable frame adapted to hold the stock, the upper portion of said frame having a hinged connection, means for imparting longitudinal movements to said frame and for imparting a semicircular movement thereto at the completion of each longitudinal movement and a guide or shoe for maintaining said frame in position while moving, substantially as and for the purposes specified.

In testimony whereof I affix my signature in presence of two witnesses.

RICHARD P. BURKHARDT, Sr.

Witnesses:
JOHN W. KALBFUS,
R. J. McCARTY.